United States Patent [19]

Abbey et al.

[11] Patent Number: 4,624,762

[45] Date of Patent: Nov. 25, 1986

[54] METHOD FOR CATHODIC ELECTROCOATING COMPOSITION COMPRISING PIGMENTED AQUEOUS LATEX BINDER

[75] Inventors: Kirk J. Abbey, Medina; David J. Foss, Chagrin Falls; Barbara L. Kunz, Bay Village, all of Ohio

[73] Assignee: SCM Corporation, New York, N.Y.

[21] Appl. No.: 723,483

[22] Filed: Apr. 15, 1985

[51] Int. Cl.$^4$ .................... C25D 13/06; C25D 13/10
[52] U.S. Cl. .................... 204/181.7; 524/507
[58] Field of Search ........................ 204/181.7

[56] References Cited

U.S. PATENT DOCUMENTS 3,994,792 11/1976 Wagener et al. ............. 204/181.7
4,308,121 12/1981 Hazan ........................ 204/181.7
4,442,247 4/1984 Ishikura et al. ............. 204/181.7

FOREIGN PATENT DOCUMENTS 48-04448 2/1973 Japan ........................ 204/181 C
436890 12/1974 U.S.S.R. .................... 204/181 C

*Primary Examiner*—Howard S. Williams
*Attorney, Agent, or Firm*—Thomas M. Schmitz

[57] ABSTRACT

A cathodic electrocoating paint composition that yields solvent-resistance films is shown. The paint binder consists essentially of:
(a) synthetic cation-active latex and resinous pigment dispersant that is crosslinkable therewith, with the proviso that when said dispersant is substantially in excess of about 15% of said latex, an external crosslinker is present that will crosslink upon curing with at least said dispersant; or
(b) synthetic cation-active latex and resinous pigment dispersant that is not crosslinkable therewith and external crosslinker that will crosslink with both said latex and said dispersant.

12 Claims, No Drawings

METHOD FOR CATHODIC ELECTROCOATING COMPOSITION COMPRISING PIGMENTED AQUEOUS LATEX BINDER

This invention relates to an improvement in aqueous cathodic electrocoating composition, more particularly to same containing a suspension of film-forming synthetic latex particles, and electrocoating with said composition.

BACKGROUND OF THE INVENTION

The application of protective and decorative coatings in the nature of paint or varnish by electrophoretic deposition now is a large industry. Quite commonly such coating processes are called "electrocoating". U.S. Patent and Trademark Office Class 204, subclass 181, reflects the large growth of this technology in recent years.

Generally, in an electrocoating process of the type concerned here, one or more cathode workpieces and one or more counterelectrodes (anodes) are maintained for a short period of time in an electrical circuit with a dilute aqueous dispersion of film-forming paint binder, usually pigmented, between them. In most such coating operations a net unidirectional electric current is passed between these electrodes at fair voltage (e.g., 50+ V.). Generally such current is rectified ac current. This causes deposition of the coating on the electrodes (workpieces). Most frequently the binder dispersion is maintained as a bath in which the electrodes are at least partially immersed. Other methods for forming the electrical circuit also have been proposed, e.g., by showering the workpieces with continuous streams of the current-carrying aqueous coating dispersion.

Representative of the earliest practical electrocoating is that shown in Allan E. Gilchrist's U.S. Pat. No. 3,230,162 of 1966. More recently cationic or cathodic electrocoating has become popular. U.S. Pat. No. 3,799,854 and many subsequent patents involving the electrodeposition of blocked isocyanate and amino resins onto a cathodic workpiece, and the subsequent curing of the electrodeposited film into a crosslinked structure are representative of such cathodic electrocoatings. These very practical techniques employ comparatively low molecular weight, structurally ionized resinous material as their fundamental paint binders for the electrocoating, in contrast to the instant latices made by emulsion polymerization.

That is not to say that the cathodic electrodeposition of synthetic latices has not been proposed before. Representative cathodic electrocoating proposals using synthetic latex binders include those of these U.S. Pat. Nos. 3,873,488; 3,882,009; 3,994,792; 3,998,776; 4,017,372; 4,225,406; 4,225,407; and 4,379,869.

Pigmentation is added most efficiently to a cathodic electrocoating latex formulation in the form of a pigment dispersion or "grind" containing resinous pigment dispersant that has molecular weight substantially lower than that of the latex (e.g., not substantially above about 20,000 for such dispersant as compared to at least about 50,000 and usually much higher for such latex—both weight averages). We have found that the solvent resistance of the resulting cured latex-bearing film can be impaired significantly by such pigmenting technique even though the resinous pigment dispersant is in a minor proportion relative to the latex.

Synthetic cation-active latex binders have been cathodically electrodeposited by themselves ("clears") from aqueous dispersion to provide films. Some of these latices are thermoplastic, and their cured films lack solvent resistance. Others are self-crosslinking when cured, e.g., with heat; their films have good solvent resistance. However, when a small proportion of resinous material of substantially lower molecular weight, such as a resinous pigment dispersant, is incorporated into such aqueous self-crosslinking latex for codeposition, the solvent resistance of the cured latex-rich film surprisingly can be quite adversely affected (despite generalized teachings to the effect that customary pigmentation is permissible in conventional cathodic electrocoating latex compositions).

Advantages of the instant invention over prior proposed latex formulations for cathodic electrocoating include the capacity to obtain pigmented cured films having good solvent resistance. The instant formulations have the additional advantage of being able to be applied without offensive organic sulfur odor problems, a complaint made about some prior art cathodic electrocoating of latices. In other words, organic sulfur compounds need not be used in the synthesis in such a way as to give odor problems.

BROAD STATEMENT OF THE INVENTION

The inventive cathodic electrocoating paint composition comprises an aqueous dispersion of pigment and film-forming, amino-stabilized cation-active binder therefor, said binder consisting essentially of at least one of the following thermosetting combinations:

(a) synthetic cation-active latex and resinous pigment dispersant that is crosslinkable therewith, with the proviso that when said dispersant is substantially in excess of about 15% of said latex, an external crosslinker is present that will crosslink upon curing with at least said dispersant; or (b) synthetic cation-active latex and resinous pigment dispersant that is not crosslinkable therewith and external crosslinker that will crosslink with both said latex and said dispersant.

DETAILED DESCRIPTION OF THE INVENTION

The instant latex is prepared by emulsion polymerization of addition polymerizable materials in aqueous dispersion, preferably ethylenically unsaturated monomers. The latex should be film-forming on a cathode during the wet electrocoating operation, that is it should have a Tg of about $-40°$ to $+60°$ C. and preferably about $-10°$ to $+30°$ C. The latex is cation-active by virtue of being amino-stabilized. By this is meant that such cation activity is provided fundamentally by a small proportion of amino, amidino, and/or guanadino functionality that is structurally a part of the latex molecule and/or is sorbed onto the surface of the latex, as in the form of a surfactant having such functionality. Additional cation activity also can be imparted by, for example, beta hydroxyethyl quaternary ammonium functionality of the latex and/or such sorbed surfactant.

Representative nonionic monomer types useful for forming suitable latices include alkenyl aromatic compounds such as styrene compounds; derivatives of alpha-methylene monocarboxylic acids such as acrylic esters, acrylic nitriles, and methacrylic esters; derivatives of alpha-, beta-ethylenically unsaturated dicarboxylic acids such as maleic esters and unsaturated alcohol esters; conjugated dienes; unsaturated ketones; unsaturated ethers; and other polymerizable vinylidene compounds such as vinyl chloride and vinyl fluoride. Specific ethylenically unsaturated compounds useful for the instant latices include styrene, alpha-methylstyrene, para-methylstyrene, ethylstyrene, diethylstyrene, t-butylstyrene, vinylnaphthalene, hydroxystyrene, methoxystyrene, cyanostyrene, acetylstyrene, monochlorostyrene, dichlorostyrene, and other halostyrenes, methyl methacrylate, ethyl acrylate, butyl acrylate, hexyl acrylate, 2-ethylhexyl acrylate, lauryl methacrylate, phenyl acrylate, 2-hydroxybutyl acrylate, 2-hydroxybutyl methacrylate, 4-hydroxybutyl acrylate, and 4-hydroxybutyl methacrylate; acrylonitrile, methacrylonitrile, acrylonilide, ethyl alpha-chloroacrylate, ethyl maleate, vinyl acetate, vinyl propionate, vinyl chloride, vinyl bromide, vinylidene chloride, vinylidene fluoride, vinyl methyl ketone, methyl isopropenyl ketone, vinyl ethyl ether, 1,3-butadiene, and isoprene. Styrene units are especially desirable in copolymers for the instant service, not only because styrene is economical, but also because it helps to impart gloss to the cured coating.

Most of the foregoing nonionic monomers tend to form water-insoluble polymers, and they are usually copolymerized with monomers having hydrophilic character for the purpose of, amongst other things, crosslinking capability and/or providing the needed cation activity. Representative of such modifying monomers are hydroxyethyl acrylate, hydroxyethyl methacrylate, hydroxypropyl methacrylate, acrylamide, methacrylamide, and modified acrylamides such as diacetone acrylamide and diacetone methacrylamide, and dimethylaminoethyl methacrylate, diethylaminoethyl methacrylate, t-butylaminoethyl methacrylate, isopropylaminopropyl methacrylamide, dimethylaminopropyl methacrylamide.

Hydrophilic monomer units in the latex structure that are not charge-bearing, e.g., those having hydroxyl and/or acrylamide functionality, can be used in modest levels; typically they are broadly used to constitute between about 2 and about 30 weight percent of the resulting thermosetting latex polymer solids and advantageously about 5–15%. The charge-bearing hydrophilic monomers for making a latex structurally cation-active desirably are used in a proportion of no more than about 5% by weight of the latex polymer solids, and preferably they amount to 0.5% or even less. Thus the resulting latex, in spite of these modifications, can be considered hydrophobic.

Emulsion polymerization to make the latex generally is carried on in a reaction zone with agitation at atmospheric pressure using a temperature of about 25° to 90° C. Typically the monomers are charged gradually to an aqueous body which can contain all of the water or only an initial fraction of it, such fraction being augmented as the reaction continues. Initiator for the latex polymerization can be present initially in the aqueous body, and it also can be added concurrently with the monomer charge. So can surfactant if surfactant is to be used at all. A preferred latex preparation is a seeded semi-continuus emulsion polymerization wherein about 0.5–10% of the monomer is used to establish a polymerized seed population by emulsion polymerization, then the rest of the ingredients are added to the recipe to form polymer upon the seeds. Small amounts of surfactants such as fatty imidazolines, ethoxylated fatty guanadines (e.g. Aerosol C61, a trademark of American Cyanamid Company), nonionics such as highly ethoxylated octyl and nonyl phenols, ethoxylated fatty alcohols, and amine-functional polymeric surfactants also can be used if necessary or desirable. In the instant latices the concentration of oligomeric or polymeric starting materials is quite low (not substantially above about 5%, e.g., from oligomeric or polymeric surfactant).

Conventional additives for latex compositions can be included in the emulsion polymerization recipe, and some can be added later. Such materials include chain transfer agents, shortstopping agents, buffers, antifoaming agents, chelating agents, plasticizers, tinting materials, and bactericides or other preservatives. In a preferred operation a "heel" of partially-reacted latex is used (thereby providing a preformed seed); additional water, the rest of the monomers and often additional surfactants and initiators then are the customary feeds in incremental or continuous fashion while the contents of the polymerization zone are agitated under conditions of temperature and pressure suitable for maintaining the polymerization. Preferably the temperature for the particular initiator system and polymerization is between about 70° and about 85° C. and the pressure is atmospheric, although higher pressures, and thus temperatures are possible. Advantageously the rate of monomer addition is low enough to control the rate of polymerization.

The initiators produce free radicals for the latex polymerization and can be, for example, certain redox systems such as: hydroxylamine hydrochloride in combination with t-butylhydroperoxide, azo types such as 2,2'-azobis(amidinopropane hydrochloride) ("AAP"), 2,2'-azobis isobutyronitrile ("AIBN"), 2,2'-azobis(2-isopropylimidazolium)dichloride, 2,2'-azobis(2-aminopropane)sulfate, or even an electron beam or gamma radiation. The latex is prepared at a polymer solids (NV) content that usually is at least about 35%, preferably about 40–60%, and even as high as about 70% in some cases. pH of a finished latex batch for the electrocoating purpose usually will be between about 1 and about 6, and generally will be between about 2 and 5. For the electrodeposition process latex emulsions are diluted with water to a solids concentration generally not above about 40% and advantageously between 1 and 30%, and most preferably at 2–20%.

Latex particle size advantageously averages (weight average) between about 1000 Å and about 6000 Å, preferably at least about 2500 Å, for resistance to mechanical shear and facility of suspension in cathodic electrocoating bath service, although ones averaging as much as 9000 Å are useable.

By use of appropriate monomeric material in their preparations functionality can be incorporated into the molecular structures of the latex and the resinous pigment dispersant for rendering these structures crosslinkable with each other or self-crosslinking. Thus, for example, blocked isocyanate functionality so incorporated can be made to crosslink upon curing with labile hydrogen functionality such as hydroxyl, unhindered secondary amine, amide, and/or thiol functionality present. If both sorts of functionality are part of the same molecular structure, that structure will be self-crosslinkable; if one sort such as the blocked isocyanate is part of one structure and the other such as labile hydrogen is part of another polymer molecule, these diverse structures can be crosslinked with each other. Typical blocked isocyanate monomers for such use are, for example, 2-isocyanatoethyl methacrylate blocked with 2-butanone ketoxime or the adduct of either toluene diisocyanate or isophorone diisocyanate having one isocyanate group reacted with hydroxyethyl methacrylate and the other blocked with caprolactam or other blocking compound such as an oxime. For this same purpose, the isopropenyl benzyl isocyanates and particularly meta-isopropenyl-α,α-dimethylbenzyl isocyanate are quite useful in incorporating crosslinkable functionality into the polymer chain. A methylolacrylamide such as isobutoxy methylolacrylamide also can be used, but as such functionality generally crosslinks most satisfactorily with some acidity present and often tends to give appreciable microgel formation, blocked isocyanates are preferred. Hydroxy functional acrylates are the preferred labile hydrogen-providing materials for a polymerization.

Curiously, however, we have found that only a limited proportion of resinous pigment dispersant can be electrodeposited with latex for effective crosslinking therewith before solvent resistance of the cured film will be markedly adversely affected. Thus, when a dispersant proportion amounts to no more than about 15% of the latex crosslinkable therewith, the solvent resistance of the cured film is lowered somewhat, but such loss usually can be tolerated. However, when an appreciably greater proportion of such dispersant is present, the solvent resistance of the cured film is very badly affected—unless the electrodeposit also contains some additional material, i.e., an external crosslinker, that will crosslink with at least the dispersant upon curing. Useful external crosslinkers include acid functional aminoplasts, e.g., melamine resins such as Cymel 1141, a trademark of American Cyanamid Company, or a blocked isocyanate such as an isophorone diisocyanate adduct blocked with epsilon caprolactam or other conventional blocking agent.

Solvent resistance of the cured film also can be obtained by use of such external crosslinker that has been codeposited with latex and resinous pigment dispersant that will not crosslink with each other, but will crosslink with such external crosslinker film component.

As noted above, adequate chain activity for the latex can be provided by a very small proportion of amino, amidino and/or guanidino functionality that is structurally a part of the latex molecule and/or sorbed onto the surface of the latex. Polymerizing charge-bearing hydrophilic monomer units into the latex structure certainly is the positive way for imparting the needed cation activity thereto. It should be noted, also, that initiators such as 2,2'-azobis(amidinopropane hydrochloride) (AAP) break down in use to provide structural amidino functionality in the polymer while the fatty imidazoline surfactants can supply useful amidino functionality for sorption onto the surface of latex having otherwise little or no cation activity. Similarly, ethoxylated fatty guanadine surfactants can impart guanadino functionality to the surface of such latices for rendering or helping to render them adequately cation active.

Suitable resinous pigment dispersants (pigment grind vehicles) for the instant invention will have functionality that is crosslinkable with that of the latex or an external crosslinker. Advantageous resins for such service include acrylic resins having some hydroxyl functionality and average molecular weight of about 2000–5000, and epoxy resin modified with an amine, such epoxy resin having average molecular weight of about 800–1600. An electrocoating binder of the present invention ordinarily will be predominantly latex with the crosslinkable resinous pigment dispersant being from about 0.1 to 40% and preferably about 5 to 30% of the binder solids; and the external crosslinker, if needed, being about 5 to 30% and preferably about 5 to 25% of the binder solids.

Customarily the wet electrocoated part is drained, blown with air to remove loosely adhering liquid, and/or rinsed. Advantageously the final rinse is with deionized water. Rinsing also can be done with a permeate from ultrafiltration of an electrocoat bath. Initial rinsing can be done with an aqueous dispersion recovered from later rinsing, e.g., from the final rinse.

Cure of the wet electrodeposit to its final dry and hardened state generally is done by baking the coated article at about 120° and 230° C. for 5 to 40 minutes, although radiation curing also is possible, e.g., by electron beam, gamma radiation, or by ultraviolet light if a sensitizer is incorporated into the film and the light is not masked by pigmentation. Air-dry (at room temperature) films also are possible in some cases, generally where service requirements are not as rigorous.

Pigmentation for the electrocoating composition typically can be provided by mixing therein pigments such as titanium dioxide, iron oxides, lead chromate, carbon black, cadmium yellows and reds, clay, silica, talc, phthalocyanine blue, chromium yellow, aluminum flake, and other conventional pigmentary materials and even fine particles of hard polymer or resin or powder paint, some of which can be caused to fuse upon curing or even to crosslink with other electrodeposited materials if desired. While such pigmentary materials usually form a minor proportion of the paint solids that are to be electrocoated, they can on occasion constitute a major proportion, especially where a plastic pigment fuses and/or reacts upon curing to give additional binding to the particles present. Pigments, particularly mineral pigments, usually are added to the electrocoating composition in the form of a pigment grind using a resinous vehicle that has molecular weight substantially below that of the latex.

Counterions for amino functionality in the coating composition are provided in the composition by acids such as formic, acetic, lactic, and/or phosphoric acids. pH of a typical composition of this invention for the instant pigmented cathodic electrocoating will be between about 3 and about 6, and generally it is advantageous to be about 4 to 5, with about 1 meq. of acid per meq. of base present.

The presence of solvents such as alkoxyalkanols, hydrocarbons such as a naphtha or toluene, or an acetate such as butyl acetate tends to lower the rupture voltage of the electrodeposited latex film. Hence, little or no solvent is preferred in manufacture of the latex, and any solvent concentration in the paint composition, based on weight of nonvolatile matter present, best is limited to about 15% by weight, maximum. Such solvent customarily is introduced into a formula with a pigment grind.

Desirably the free monomer in the latex, and, thus, in the cathodic electrocoating composition, is maintained very low. By using one or more clean-up procedures at the end of the latex polymerization, one can accomplish this. One such procedure is to treat the latex finally with a series of successive small initiator additions and to raise the final temperature for reacting virtually all of the free monomer present, if not all. Other useful techniques include adding a small proportion of highly reactive monomers such as an acrylate to combine with, for example, free vinyl acetate, or to stop a styrene feed near the end of the latex-making reaction (because such monomer can inhibit the complete polymerization of other less reactive monomers present). Vacuum stripping is an alternate method of free monomer removal. Gas chromatography is useful for determining the level of residual monomer, which desirably is not more than about 2% and is preferred to be much less.

For the highest quality of cathodic electrodeposition desired here it is especially important to remove amino monomers and amino initiator fragments, which can impart roughness to a cathodically-electrodeposited film of the latex; "amino" is used here in the broad sense to comprehend monomers and fragments of molecular weight not above 300 and having amino, guanidino, and/or amidino functionality, and, in general, nitrogenous functionality that is basically-reacting in aqueous dispersion. When such monomer is fully reacted, it is effectively sequestered. Ion exchange of the latex with an ion exchange resin in acid form is useful for eliminating virtually all of the free amino monomer and amino initiator fragments; these should not be substantially above about 4 ppm of the latex solids.

As mentioned above, an electrocoating bath composition here advantageously will contain about 1 to 30% by weight of solids. The replenishment feed composition for an instant cathodic electrocoating bath will have greater concentration than this, and it can reach 50-60% of such solids. By using a replenishment composition deficient in acid relative to ionizable amino, guanidino, and/or amidino groups in such replenishment composition, one can help to keep the buildup of acid in an operating bath under control. The bath also can be purged by use of membranes which will permit bath components to be withdrawn quite selectively as by electrodialysis or ultrafiltration or a combination of these techniques.

The following examples illustrate the invention, but should not be construed as limiting it. In this specification all percentages are weight percentages, all parts are parts by weight, and all temperatures are in degrees Centigrade unless otherwise expressly indicated. In the examples the electrocoating test tank held a liter of paint dispersion. The tank was divided into a larger dipping section and a smaller agitator section by a vertical wier to one side tht fixed the depth of the painting bath. The wier was short of the bottom of the tank to permit recirculation of bath dispersion from the agitator section into the bottom of the dipping section. Paint dispersion flowed over the wier into the agitator section, then was impelled downwardly by a propellor-type agitator into the bottom of the dipping section. This created a circulation of the paint dispersion with a level top surface in the dipping section. A 4"×4" (10.2 cm.) conventionally phosphated (Parker Bonderite 1000 iron phosphated) 20 ga. (0.95 mm.) steel panel was lowered over about 9 seconds to a depth of 3½" (8.9 cm.) with power on, the immersion being made about centrally to the wall confines of the dipping section of the tank. The tank was charged as an anode and panel as a cathode with constant voltage impressed therebetween. Power was left on for 64 seconds after a panel was fully immersed, then turned off and the wet coated panel withdrawn from the bath. It was rinsed with deionized water. Unless otherwise specially noted each panel was baked for 20 minutes at 163° to cure the resulting wet electrodeposited film.

The electrocoating process was very rapid. The wet coating was substantially complete in a few seconds after a panel had been immersed to the final depth (with attendant virtually complete shutoff of current in the circuit). The cured coatings made at a voltage below rupture voltage were ostensibly perfect, smooth and shiny. Their thicknesses were from approximately ½ mil (0.013 mm.) to 1½ mils (0.038 mm.), depending upon the particular test conditions.

For each coating composition tested panels were electrocoated from a 25° C. bath at the following constant voltages: 100, 150, 200, and 250; and from a 45° C. bath at voltages 200, 300, 400, and 500. Rupture of wet films occurred usually at 500 V. and infrequently at 400 V. The solvent-resistance value for each unruptured cured film was determined according to the procedure described hereinafter. These values were averaged for a particular coating composition. Such average is the number reported for solvent resistance in the examples which follow.

Solvent resistance of a cured electrodeposited film was measured by the number of methylethyl ketone double rubs necessary to wear through the coating and expose a spot of the substrate. In this procedure one layer of laboratory towelling wrapped around the index finger was saturated with methylethyl ketone, then the saturated cloth rubbed across the coated surface using 2- to 3-inch strokes in the direction of the grain of the metal under hand-weighted normal pressure. The cloth was resaturated every 10 double rubs, one double rub being a forward and a return stroke. Initial thickness of the cured film was measured, and the number of double rubs needed to expose a spot on the electrode surface was noted. The solvent-resistance value of a particular film was calculated as the number of such double rubs to penetrate the coating divided by the thickness of the cured coating in mils, a mil being 0.0254 mm.

FORMULATION OF DISPERSANT ADDITIVES

A solution of 79.4 parts of cationic acrylic copolymer resin in 20.4 parts of 2-hexoxyethanol and 0.2 part of xylene was the pigment grind vehicle (i.e., resinous pigment dispersant). Such resin had average molecular weight of about 3,800. Its monomer composition was 26.3% styrene, 36.1% ethyl acrylate, 7.1% hydroxyethyl acrylate, and 11.8% dimethylaminoethyl methacrylate. The hydroxyethyl acrylate provided crosslinking functionality that could react with a self-crosslinking latex and also with a separate crosslinker added specially to the coating formulation (i.e., an "external" crosslinker).

The resinous pigment dispersant solution was compounded in several ways to make dispersant additives for the various cation-active latex electrocoating baths. The composition of these dispersant additives was as follows:

| Ingredient (all wt. %) | Dispersant (1) | Additive (2) | Composition (3) |
| --- | --- | --- | --- |
| Acrylic Resin Solution | 43.3 | 19.9 | 14.9 |
| Lactic Acid | 2.3 | 1.0 | 1.2 |
| *Crosslinker Solution | None | 26 | 19.4 |
| Pigmentary Rutile Titania | None | None | 23.3 |
| Deionized Water | 54.4 | 53.1 | 40.1 |

*B1370, a product of Chemische Werke Huls AB., blocked isophorone diisocyanate derivative, 60% solids in a solvent mixture of 3 parts of n-butyl acetate and 5 parts of xylene, containing no free isocyanate, having approximately 8% blocked isocyanate content a splitting temperature of 130° C., and density of 1.03 at 25° C.

Three latices were prepared according to the recipies tabulated below. In these preparations the Group A ingredients for each latex were heated in an agitated reactor to 75° C. which was sparged with nitrogen. weight of such dried residue is noted. For good cathodic electrocoating a value of zero is the criterion.

| Group | Ingredient | Parts per 100 parts of Monomer | | |
|---|---|---|---|---|
| | | Latex I | Latex II | Latex III |
| A | Deionized Water | 134.3 | 137.9 | 139.0 |
| | *Triton X-405 | 0.1 | 1.4 | 0.2 |
| | H₃PO₄, (85.6% solution in water) | 0.1 | 0.1 | 0.1 |
| B | As listed (abbreviations spelled out below) | BA 0.7 MMA 1.3 | 10% of Group D Ingredients | BA 0.7 MMA 1.3 |
| C | Deionized Water | 4.2 | 4.1 | 4.2 |
| | 2,2'-azobis (2-amidino-propane hydrochloride) (AAP) | 0.1 | 0.1 | 0.1 |
| D | Butyl acrylate (BA) | 49.3 | 52.4 | 50.5 |
| | Methyl methacrylate (MMA) | 32.8 | 27.4 | 18.7 |
| | Styrene | — | 20.0 | 20.0 |
| | Hydroxypropyl methacrylate (HPMA) | 8.6 | — | 8.7 |
| | Dimethylaminoethyl methacrylate (DMAEMA) | 0.2 | 0.2 | 0.2 |
| | n-dodecyl mercaptan (n-DDM) | 0.2 | 0.2 | 0.2 |
| | **Blocked isocyanatoethyl methacrylate (b-IEMA) | 7.3 | — | — |
| | CBr₄ | 0.8 | — | — |
| E | Deionized Water | 11.5 | 8.3 | 8.5 |
| | AAP | 0.3 | 0.2 | 0.2 |
| | *Triton X-405 | 0.6 | — | 1.3 |

*The trademark of Rohm & Haas Company for the nonionic surfactant ethoxylated octylphenol having an average of 40 moles of ethylene oxide per mole of the phenol.
**Blocked with 2-butanone ketoxime.

Thereafter a nitrogen gas blanket was maintained over the agitated reaction mixture. The Group B ingredients were added, and, after about 5 minutes, the Group C ingredients. This was followed by a 4-hour addition of the Group D ingredients and, starting simultaneously with the Group D ingredients, a 4½-hour addition of the Group E ingredients. After the addition of the Group E ingredients had been completed, the mixture was held at 75° with agitation for about 1 hour, then cooled to room temperature. The synthetic latices of the resulting emulsions each had molecular weight (weight average) estimated to be well above 100,000. The latex solids content of a dispersion, like the other nonvolatile matter contents ("NV") referred to in this specification, can be determined from the weight remaining after evaporating volatile matter at 125° C. for 30 minutes from a thin film of sample inhibited against further polymerization with hydroquinone. The phosphoric acid in the latices amounted to one meq. of its first hydrogen per meq. of base present; in the dispersant additive compositions lactic acid was used as the ionizer in the same meq. proportion.

The resistance to shear stress of each of these latices (shear stability) was considered good for the instant cathodic electrocoating service because none produced coagulum or increased significantly in viscosity in the following test:

A sample of latex, as synthesized and containing 100 grams of latex solids, is strained through a 200-mesh U.S. standard sieve and charged into the 24-ounce cup of a Hamilton Beach milkshake mixer Model No. 30. Two grams of defoaming agent (Foamaster S, the trademark of Diamond Shamrock Corporation) is added. The sample is mixed at room temperature for 30 minutes at the medium speed setting, then strained through a 200-mesh sieve. The residue thus trapped (coagulum) is rinsed clear of adhering latex with deionized water, collected, and dried at 105° C. for about 60 minutes. The The resulting latices were cation-exchanged at room temperature with Amberlite 200 C resin in acid form to remove therefrom virtually all amino initiator fragments and amino monomers that are readily neutralized by such resin. Amberlite 200 C is the trademark of Rohm & Haas Corporation for a macroreticular strongly acidic styrene/divinylbenzene ion exchange resin having the following properties: apparent wet density of 0.8, shipping weight 50 lbs./ft.³, effective size approximately 0.61 mm. diam., and moisture content approximately 48%.

Latex I was self-curing by virtue of its blocked isocyanatoethyl methacrylate and hydroxylated monomer content. Latex II had no such monomer units and therefor was thermoplastic. Latex III was crosslinkable with an external crosslinker by virtue of its hydroxylated monomer content, but was not self-crosslinking.

EXAMPLE 1

Cationic electrocoating baths were made at 5% nonvolatile matter by diluting the foregoing numbered Latices I, II, and III, respectively, with deionized water. Films of Latex III were heat-cured for 20 minutes at 190° C., of the other two at 163° for such time. The solvent resistance of the resulting cured electrocoated films was 80 for self-curing Latex I, but only 2 for each of the latices numbered II and III (neither of which could be crosslinked in this situation).

EXAMPLES 2-7

Six exemplary cationic electrocoating bath formulae were compounded from the foregoing numbered latices, the foregoing numbered dispersant additive mixtures and deionized water diluent in the bath concentrations and bath solids proportions indicated. The solvent resistance of the resulting cured electrocoated films after 20 minutes at 190° C. is tabulated below.

Inspection of Examples 2 and 3 of the following table show that the loss in solvent resistance of the cured electrocoated film codeposited with self-curing latex I and low molecular weight resinous pigment dispersant reactive therewith can be considered tolerable when such resinous dispersant proportion is modest, but if such proportion reaches as much as 25%, then the solvent resistance of the cured film is very seriously impaired. Example 4, in contrast to Example 2, however, shows the establishment of good solvent resistance in a cured film that is electrodeposited from such resinous dispersant-rich system; this is done by incorporating external crosslinker into the electrocoating bath, which crosslinker can react upon curing with at least the resinous dispersant and, desirably, with both the self-curing latex and such dispersant as in this instance.

Example 5 of this table shows the outstanding solvent resistance of a cured, cathodically electrodeposited film of self-curing Latex I and dispersant additive (3) that contains an appreciable proportion of low molecular weight pigment dispersant resin relative to the latex plus external crosslinker (blocked diisophorone diisocyanate) and inorganic pigmentary solids.

The poor solvent resistance of a cured film whose latex content is only thermoplastic (Latex II) is manifest from the test results of Example 6. However, when such cationic latex is modified with hydroxyl functionality to render it crosslinkable (Latex III) with the external crosslinker present in dispersant additive (3) and codeposited with the same low molecular weight resinous pigment dispersant reactive with such external crosslinker, the cured film has appreciable solvent resistance (Example 7).

an external crosslinker is present that will crosslink upon curing with at least said dispersant; or (2) synthetic cation-active latex and resinous pigment dispersant that is not crosslinkable therewith and external crosslinker that will crosslink with both said latex and said dispersant;

(B) depositing said paint on said cathode by imposing an electrical current on said circuit to cause said paint to deposit as a coating on the cathode article;

(C) removing the coated substrate; and (D) curing said substrate to produce an article having a solvent resistant coating thereon.

2. An article coated by the method of claim 1.

3. A method for cathodic electrocoating an electrically conductive article serving as a cathode in an electrical circuit consisting of said cathode, an anode, and an electrodepositable paint which comprises:

(A) providing a cathodic electrocoating paint composition comprising an aqueous dispersion of pigment and film-forming, amino-stabilized cation-active binder therefor, said binder consisting essentially of at least one of the following thermosetting combinations:

(1) synthetic cation-active latex and an aqueous resinous pigment dispersant that is crosslinkable therewith, with the proviso that when said dispersant is substantially in excess of about 15% of said latex, an external crosslinker is present that will crosslink upon curing with at least said dispersant; or (2) synthetic cation-active latex and an aqueous resinous pigment dispersant that is not crosslinkable therewith, and external crosslinker that will

TABLE

| Example No. | Latex No. | Dispersant Additive No. | Bath Solids Concentration (NV %) | Ratio Bath Solids from Latex/ Bath Solids from Dispersant Additive | Cured Film Solvent Resistance |
|---|---|---|---|---|---|
| 2 | I | (1) | 5 | 75/25 | 20 |
| 3 | I | (1) | 5 | 90/10 | 55 |
| 4 | I | (2) | 5 | 75/25 | 90 |
| 5 | I | (3) | 10 | 60/40 | >100 |
| 6 | II | (3) | 10 | 50/50 | 2 |
| 7 | III | (3) | 10 | 50/50 | 65 |

Weight average particle size of Latices I and III were determined by disc photosedimentometer (U.S. Pat. No. 4,311,039). They were 4300 Å and 2700 Å, respectively. Latex II had number average particle size of 1900 Å, determined by turbidity.

The instant patent application is related to the following commonlyassigned patent applications, the disclosures of which are incorporated herein expressly for reference: Ser. No. 513,621, filed July 14, 1983 now U.S. Pat. No. 4,512,860; Ser. No. 513,620, filed July 14, 1983 now U.S. Pat. No. 4,526,260; and Ser. No. 513,619 filed July 14, 1983, now U.S. Pat. No. 4,511,446.

What is claimed is:

1. A method for cathodic electrocoating an electrically conductive article serving as a cathode in an electrical circuit consisting of said cathode, an anode, and an electrodepositable paint which comprises:

(A) providing a cathodic electrocoating paint composition comprising an aqueous dispersion of pigment and film-forming, amino-stabilized cation-active binder therefor, said binder consisting essentially of at least one of the following thermosetting combinations:

(1) synthetic cation-active latex and resinous pigment dispersant that is crosslinkable therewith, with the proviso that when said dispersant is substantially in excess of about 15% of said latex, crosslink with both said latex and said dispersant;

(B) depositing said paint on said cathode by imposing an electrical current on said circuit to cause said paint to deposit as a coating on the cathode article;

(C) removing the coated substrate; and (D) curing said substrate to produce an article having a solvent resistant coating thereon;

wherein said cation-active latex is prepared by emulsion polymerization in an aqueous medium using acrylate and/or methacrylate monomer units and polymerization monomer units having secondary and/or tertiary amino functionality sufficient to render the latex structurally cation-active on complete or partial ionization and wherein the average particle size of said latex is not substantially smaller than about 1000 Å; and wherein the dispersant constitutes from about 0.1 to 40 weight percent basis binder solids.

4. The method of claim 3 wherein the resinous pigment dispersant contains hydroxyl group functionality adapted to react with latent isocyanate functionality present either in the latex or present as external crosslinking agent.

5. The method of claim 4 wherein the resinous pigment dispersant is selected from the group consisting of a cationic acrylic polymer and an epoxy resin modified with an amine and constitutes 5% to 30% of binder solids.

6. The method of claim 5 wherein the pigment dispersant is an epoxy resin modified with an amine.

7. The method of claim 3 wherein the latex is self-crosslinking and its cation-activity is derived from acrylate or methacrylate monomer having tertiary amino functionality.

8. The method of claim 7 wherein the pigment dispersant is a cationic acrylic polymer obtained by the polymerization of styrene, ethyl acrylate, hydroxyethyl acrylate and dimethylaminoethyl methacrylate and said polymer is at least partially neutralized to render the dispersant water soluble.

9. The method of claim 3 wherein said latex contains hydroxyl group functionality adapted to react with latent isocyanate functionality present either in the latex or as external crosslinking agent.

10. The method of claim 3 wherein the pigment dispersant is crosslinkable with said latex and said dispersant is present in amounts below about 15% basis latex.

11. The method of claim 3 wherein the pigment dispersant is crosslinkable with said latex and said dispersant is present in amounts greater than about 15% and the composition contains an external crosslinking agent.

12. The method of claim 3 wherein the latex is not crosslinkable with said pigment dispersant and the composition contains an external crosslinking agent.

* * * * *